Oct. 16, 1945.   W. F. SCHMIED   2,387,093
WHEEL TRUCK MOUNTING
Original Filed Nov. 22, 1943
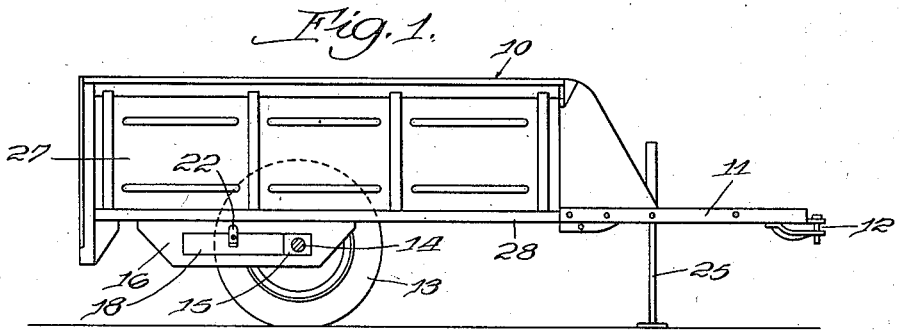
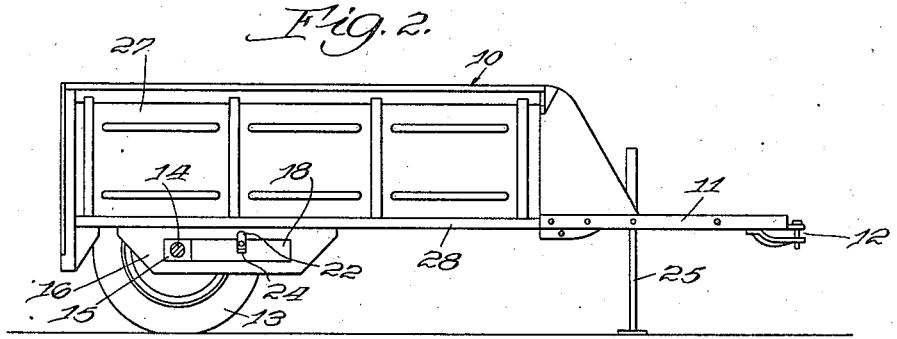
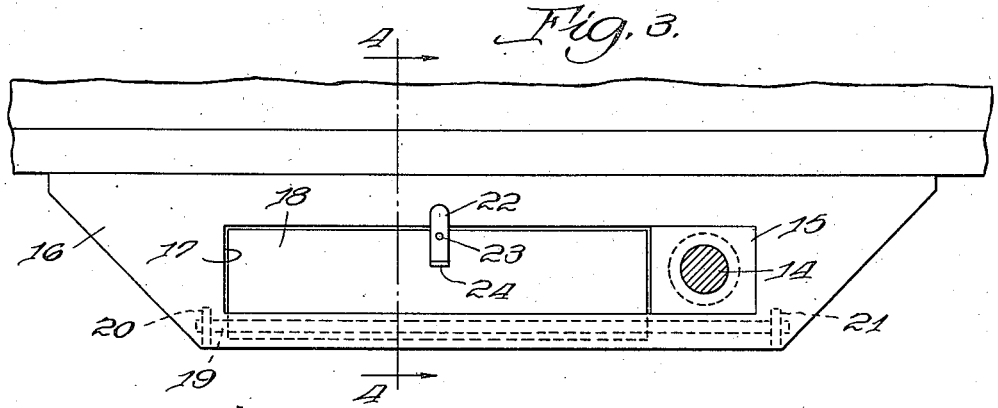
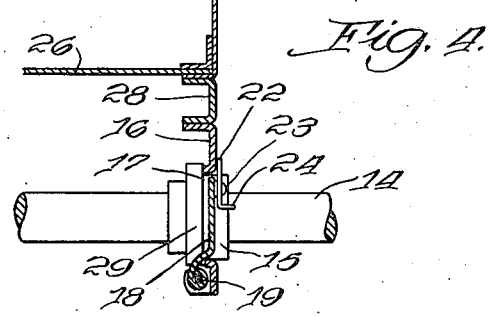
Inventor:
William F. Schmied.
By Paul O. Pippel
Atty.

Patented Oct. 16, 1945

2,387,093

UNITED STATES PATENT OFFICE 2,387,093

WHEEL TRUCK MOUNTING

William F. Schmied, Blue Island, Ill., assignor to International Harvester Company, a corporation of New Jersey Original application November 22, 1943, Serial No. 511,284. Divided and this application May 1, 1944, Serial No. 533,449

3 Claims. (Cl. 280—63)

This invention relates to a wheel truck mounting and is a division of an application entitled "Detachable manure spreader" having Serial No. 511,284 and jointly filed November 22, 1943, by Messenger, Johnson, and Schmied.

An important object of this invention is to provide a cart or wagon with a shiftable wheel truck.

Another important object of this invention is the provision of a longitudinal shiftable wheel truck to effect a change in cart weight distribution.

A further important object of this invention is to provide a farm cart capable of various uses.

A still further important object of the invention is the provision of means for positioning the wheel truck of a farm cart in either one of two limiting positions.

Other and further important objects of the invention will become apparent from the disclosures in the following specification and accompanying drawing, in which:

Figure 1 is a side elevation of the farm cart incorporating the novel wheel truck mounting;

Figure 2 is another side view of the farm cart as shown in Figure 1 with the wheel truck in shifted position;

Figure 3 is an elevational view partially in section of the wheel truck mounting; and Figure 4 is a sectional view taken on the line 4—4 of Figure 3.

As shown in the drawing:

The reference numeral 10 indicates generally a two wheeled farm cart having a forwardly extending tongue 11 with a clevis as shown at 12 for the purpose of hitching to a draft vehicle such as the draw-bar of a tractor. Wheels 13 are mounted on an axle 14 within bearing blocks 15. Depending brackets 16 are fixedly attached beneath the cart and adjacent each side. These brackets 16 have elongated longitudinal slots 17 within which the bearing blocks 15 are adapted to slide. Gate members 18, as best shown in Figs. 3 and 4, are slidably hinged on rods 19 fixedly mounted on the spaced apart projections 20 and 21 on the depending brackets 16. As shown in Figure 4, the lower edge of the gate member 18 is wrapped around the rod 19 so that the gate 18 may have hinged swinging movement therearound.

It will be noted that the gate 18 does not completely fill the elongated rectangular slot 17 in the depending bracket 16, but rather is shorter than the length of the slot by an amount equal to the width of the bearing block 15. The gate is provided with a latch member 22 which is pivoted at 23 and acts to hold the gate and bracket 16 together. A spring pressed latch may be employed to obtain more friction between the latch and the gate face and thereupon eliminate undesirable slipping or turning of the latch. A handle portion 24 is provided for manually turning the latch into a horizontal position whereupon the gate 18 may swing inwardly about the hinge rod 19 away from the bracket 16. When the gates are so swung inwardly, the bearing blocks 15 and wheel axle 14 may be shifted within the slots 17 to the opposite or rear end thereof as shown in Figure 2. When the wheel axle or truck is in its rear end position, the gates 18 are slid along their respective rods 19 so that they are in the forward portion of the longitudinal slots 17. The gates are then swung upwardly about the hinge rods 19 into position within the longitudinal slots 17 and the latch 22 rotated to a vertical position, thereupon locking the wheel truck composed of the axle and bearing blocks 14 and 15, respectively, in the rear portions of the slots 17.

The farm cart 10, as shown in Figure 1, with the wheel truck in the forward position is equipped for general purpose duty. In such position, the substantially central position of the wheel truck is capable of better assuming the cart load. The forward end of the cart is supported by a tractor draw-bar (not shown), and it is essential that not too great a load be applied to the draw-bar. In other words, it is desirable to have the cart wheels assume the major portion of the cart load and merely have the tractor draw-bar for purposes of balancing the cart. When the cart is not in active use, a leg member 25 is provided on the tongue to support the forward end of the cart and permit a tractor to have its draw-bar backed into the clevis 12.

As shown in the parent application referred to above, it is the object of the general purpose farm cart to be transformed into a fertilizer spreader with such attachment being applied to the rear of the cart. When an attachment of this sort is applied to the cart, the weight is shifted rearwardly, and with the wheels in the position as shown in Figure 1, there would be an upward force exerted upon the tongue 11 and hence an upward force on the tractor draw-bar which would tend to lessen the effectiveness of the traction wheels of the tractor. The wheel truck is then shifted to its rearward position, as shown in Figure 2, thus, counterbalancing the effect of the additional weight on the end of the cart and thus tending to balance the effective downward or upward force of the cart tongue 11.

As shown in Figure 4, the cart 10 has a floor portion 26 and upwardly extending side walls 27. Beneath the box portion of the cart are positioned longitudinally extending channel members 28 below which the brackets 16 depend. Circular flanges 29 are provided on the axle 14 positioned directly behind each rectangular bearing block 15, thus maintaining the bearing block 15 within the elongated rectangular slot 17.

It is obvious that the wheel truck may be positioned in either of two limiting positions as desired. The novel shiftable wheel truck mounting, as herein shown and described, contributes greatly to the successful multiple use of farm carts.

What is claimed is:

1. In a cart comprising a wheel truck having a pair of wheels, an axle, a pair of bearings on said axle, and a pair of brackets attached to the underside of said cart, said brackets having opposed elongated slots, said axle bearings slidably positioned in said elongated slots, and means for locking said bearings in either end of said slots, said means including longitudinally hinged members.

2. In a cart comprising a wheel truck having a pair of wheels, an axle, a pair of bearings on said axle, and a pair of brackets attached to the underside of said cart, said brackets having opposed elongated slots, said axle bearings slidably positioned in said elongated slots, and means for locking said bearings in either end of the said slots, said means comprising slidably hinged gates, whereby said gates may close into said elongated slots adjacent said bearings and substantially fill said slots for preventing sliding of the bearings.

3. In a cart comprising a wheel truck having a pair of wheels, an axle, and a pair of bearings on said axle, a pair of brackets attached to the underside of said cart, said brackets having opposed elongated slots, said axle bearings slidably positioned in said elongated slots, means for locking said bearings in either end of the said slots, said means comprising slidably hinged gates, whereby said gates may close into said elongated slots adjacent said bearings and substantially fill said slots for preventing sliding of the bearings, and latch means for said hinged gates to hold the bearings in fixed position.

WILLIAM F. SCHMIED.